United States Patent [19]

Sadan

[11] Patent Number: 5,281,242
[45] Date of Patent: Jan. 25, 1994

[54] METHOD FOR RECOVERING MAGNESIUM SULFATE PRODUCTS FROM MIXTURES OF EPSOMITE AND HALITE

[75] Inventor: Abraham Sadan, Park City, Utah

[73] Assignee: Exportadora de Sal, S.A de C.V., Guerrero Negro, Mexico

[21] Appl. No.: 857,040

[22] Filed: Mar. 24, 1992

[30] Foreign Application Priority Data

Jun. 10, 1991 [MX] Mexico ................................ 26178

[51] Int. Cl.$^5$ ................................................ C01F 5/40
[52] U.S. Cl. ................................. 23/304; 23/293 R; 423/170; 423/554
[58] Field of Search ............. 23/304, 293 R; 423/554, 423/170

[56] References Cited

U.S. PATENT DOCUMENTS

| | | | |
|---|---|---|---|
| 2,034,685 | 3/1936 | Langer | 23/304 |
| 3,201,208 | 8/1965 | Heins et al. | 23/304 |
| 3,688,991 | 9/1972 | Andrews | 241/27 |
| 3,873,275 | 3/1975 | Bennett . | |
| 3,961,904 | 6/1976 | Bennett . | |
| 4,244,698 | 1/1981 | King et al. | 23/313 FB |
| 4,533,360 | 8/1985 | Cozza et al. | 23/298 |

FOREIGN PATENT DOCUMENTS 102883 9/1978 Japan .

OTHER PUBLICATIONS

Fernádez-Lozano, J. A. "Recovery of Epsomite and Sylvite From Seawater Bittern by Crystallization." *Fourth Symposium on Salt,* Alan H. Coogan, The Northern Geological Society, Inc. Cleveland, Ohio, vol. 2, pp. 501-510 (1974).

Pavlik, A. et al., "Description and Operation of a High Capacity Evaporator for the Production of a Very Pure Chemical Grade Salt", Fifth International Symposium on Salt, pp. 335-339.

*Primary Examiner*—Wayne Langel
*Attorney, Agent, or Firm*—Pennie & Edmonds

[57] ABSTRACT

A simple, efficient and inexpensive method of purifying magnesium sulfate from mixtures of epsomite and halite. The method allows for the preparation of substantially pure magnesium sulfate products. The method generally involves heating a mixture of epsomite and halite to form clusters of lower hydrated magnesium sulfate crystals and subsequently applying slight pressure to the clusters so that they collapse to yield fine, less hydrated magnesium sulfate crystals which can then be easily separated from the comparatively coarse halite crystals. The less hydrated magnesium sulfate crystals can be recrystallized to provide highly purified epsomite which can then be dehydrated to provide kieserite or anhydrous magnesium sulfate.

30 Claims, 3 Drawing Sheets

METHOD FOR RECOVERING MAGNESIUM SULFATE PRODUCTS FROM MIXTURES OF EPSOMITE AND HALITE

TECHNICAL FIELD

The invention relates generally to the preparation of substantially pure magnesium sulfate products and more particularly to a method for recovering such products from mixtures of epsomite and halite.

BACKGROUND ART

Magnesium sulfate monohydrate ($MgSO_4.H_2O$) and the higher hydrates of magnesium sulfate are naturally occurring materials having many uses. For example, they are known as fireproofing materials, as catalyst carriers, for use in warp-sizing and loading cotton goods, weighting silk, dyeing and calico printing, as an ingredient in mineral waters, and are used in ceramics, fertilizers, paper, cosmetic lotions, dietary supplements, laxatives, and as a therapeutic bath salt.

A number of methods are known in the prior art for the production and purification of magnesium sulfate ($MgSO_4$) and its hydrates. For example, these materials are sometimes produced by reacting sulfuric acid ($H_2SO_4$) with either magnesia (MgO) or magnesite ($MgCO_3$). However, this method is very expensive and the magnesium sulfate produced may still require subsequent purification due to impurities present in the magnesia or magnesite feed stock.

Alternatively, hydrated magnesium sulfate may be produced by dissolving kieserite (magnesium sulfate monohydrate) and then subsequently refrigerating this resulting solution.

Kieserite is mined in large quantities, for example in Germany, and after washing, supplies most of the world's magnesium sulfate market. It contains various impurities, however, including halite (i.e., sodium chloride) and, in addition, it comprises only 89-93% magnesium sulfate monohydrate. Moreover, since the mined kieserite is only partly soluble in ambient water it is not acceptable for use in certain applications, for example, as a therapeutic bath salt or as a laxative.

The refrigeration process described above requires the refrigeration of an unduly large amount of magnesium sulfate-containing solution to obtain a commercially desirable quantity of epsomite and is thus not particularly commercially feasible. For a further discussion of the refrigeration process, see, e.g., Fernàndez-Lozano, "Recovery of Epsomite and Sylvite from Seawater Bittern by Crystallization", *Fourth Symposium on Salt*, Alan H. Coogan, The Northern Ohio Geological Society, Inc., Cleveland, Ohio, Vol. 2, pp. 501-510 (1974).

Epsomite is a heptahydrate of magnesium sulfate having the chemical formula $MgSO_4.7H_2O$. It is often found mixed with halite (i.e., NaCl) in nature. Such mixtures are readily isolated from seawater by solar evaporation. In the past, however, these mixtures have not been relied upon as a source of magnesium sulfate or its hydrates since epsomite and halite react upon contact in certain aqueous solutions to form double salts, i.e., a condition wherein two salts crystallize from a melt or from a solution in simple stoichiometric proportions, forming a distinct crystal lattice. The double salts formed in this case are mainly of magnesium and sodium sulfate. An example of such a double salt is astrakanite ($MgSO_4.Na_2SO_4.4H_2O$), which is formed according to the following reaction:

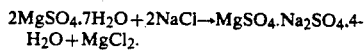

$$2MgSO_4.7H_2O + 2NaCl \rightarrow MgSO_4.Na_2SO_4.4H_2O + MgCl_2.$$

The formation of such double salts, when they occur, makes the extraction of magnesium sulfate from the mixture extremely difficult.

Consequently, the separation of epsomite and halite must take place in a medium in which the two substances cannot react, i.e., so as not to form double salts. A simple, cost-effective method has thus long been desired for separating these two materials in a manner to provide substantially pure magnesium sulfate products without the formation of double salts as described above.

SUMMARY OF THE INVENTION

The present invention provides a simple, cost-effective method of separating substantially all the magnesium sulfate present in an epsomite-halite mixture to obtain substantially purified magnesium sulfate products without the formation of double salts as described above.

In the method of the present invention, magnesium sulfate is separated from epsomite-halite mixtures by converting the epsomite portion of the mixture in the manner described below into fine magnesium sulfate crystals (i.e., substantially more fine than the epsomite crystals) having a degree of hydration lower than epsomite (i.e., $<7H_2O$). Due to their smaller size, the resultant less-hydrated crystals may then be readily separated from the comparatively larger and coarser halite crystals.

More specifically, the epsomite-halite mixture is first heated at a temperature above about 47° C., i.e., the temperature at which epsomite crystals become unstable, but below about 83° C., the melting temperature of epsomite. Heating at this temperature causes the epsomite crystals to break down into clusters formed of a plurality of fine crystals of magnesium sulfate hexahydrate or of lower hydrates of magnesium sulfate, which remain clumped together such that the clusters typically maintain the shape of the original epsomite crystals. The amount of hexahydrate or lower hydrated crystals that are formed depends on the length and temperature of the heating, i.e., the lower the temperature and the shorter the heating period, the greater the likelihood that the crystals will be composed mostly of magnesium sulfate hexahydrate. Conversely, higher temperatures and/or longer periods of heating tend to produce magnesium sulfate products with a correspondingly lower degree of hydration.

Applying a minimal amount of pressure to the crystal clusters thus formed causes them to collapse and separate into a plurality of individual magnesium sulfate hexahydrate ($MgSO_4.6H_2O$) or lower hydrated crystals. These newly formed magnesium sulfate crystals are not affected by the heat or pressure applied as described above. These fine crystals are then separated from the comparatively coarse halite crystals by methods well known in the art, such as screening.

Thereafter, in one embodiment of the invention, the hexahydrate or lower hydrate crystals thus formed may be subsequently recrystallized by hydrating them in, for example, an atmospheric crystallizer to form high grade epsomite crystals. "High grade", as used herein means a product of about 99.97% purity. These high grade crystals may then, if desired, be further recrystallized in, for example, a vacuum crystallizer to obtain a final product comprising pure grade epsomite crystals "Pure" grade as used herein means a product of between about 99.98% to about 100% pure. A suitable vacuum crystallization apparatus is one such as described in U.S. Pat. No. 3,873,275 or U.S. Pat. No. 3,961,904, the disclosures of which are incorporated herein by reference.

In an alternate embodiment of the invention, the hexahydrate or lower hydrate crystals which have been separated from the comparatively coarse halite crystals can be recrystallized with the use of a counter-current belt filter extractor to provide high grade epsomite.

The purified epsomite crystals produced by any of the above-described embodiments may, in turn, be subsequently melted at a temperature of above about 80° C. or dissolved in a solvent at a temperature of about 70° C. to about 80° C. The resultant magnesium sulfate solution, or slurry thereof, can then be dehydrated in a fluidized bed drier. The dehydration is performed at different temperatures to form magnesium sulfate crystals having various degrees of hydration, such as anhydrous magnesium sulfate and magnesium sulfate monohydrate, depending upon the dehydration temperature used. These two products are particularly preferred because they can serve as excellent desiccants. This is because the monohydrate or anhydrous crystals can absorb water to re-form epsomite without altering the crystals' original shape, size or appearance.

Alternatively, the solution or slurry can instead be dehydrated in a spray drier. It is preferred, however, that the magnesium sulfate crystals be dehydrated in a fluidized bed drier because the particles obtained from the spray drying process tend to be too fine for use in certain applications.

DETAILED DESCRIPTION OF THE PREFERRED EMBODIMENTS

Figure 1:
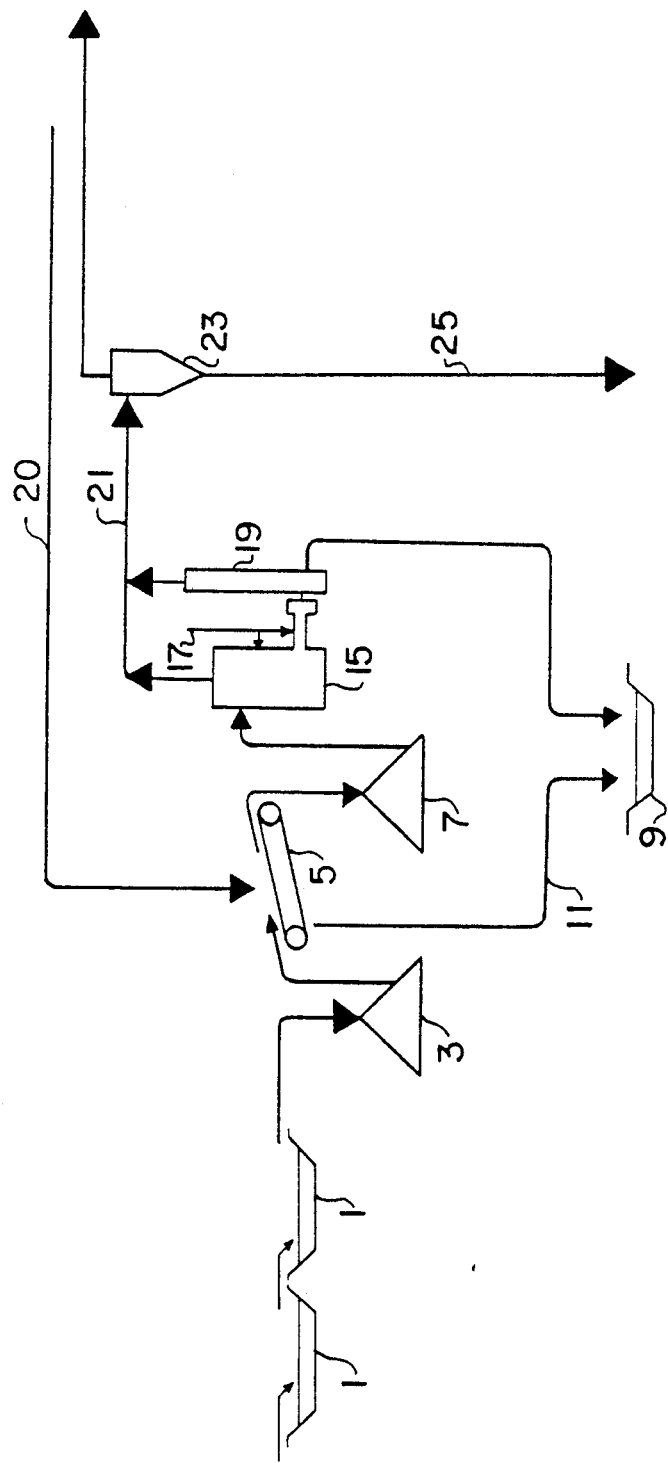
FIG. 1 is a flow diagram illustrating a first portion of the process of the invention wherein an epsomite-halite mixture is heated to induce cluster formation of the epsomite component of the mixture and pressure is applied to break the clusters, allowing for the separation of magnesium sulfate crystals from coarse halite.

The present invention thus provides a simple and relatively inexpensive method for separating epsomite from epsomite-halite mixtures which overcomes the drawbacks of the prior art processes described above. Turning initially to FIG. 1, epsomite-halite mixtures from salt ponds(1) are harvested and transported to stock pile(3). This material is then carried by conveyer belt(5) to stock pile(7) in a manner such that, while traveling between stock piles (3) and (7), the fines are removed from the mixture(11), and transported to evaporation ponds(9) to be subsequently re-harvested after further crystal growth, leaving behind the relatively coarse particles upon which the process of the invention is carried out.

The epsomite-halite mixture(7) is then placed within a fluidized bed heater(15) and heated using a gas, liquid, or steam medium. In the case of a liquid medium, the medium may be organic based liquid, an oil, such as mineral oil, or an aqueous solution that will not cause magnesium sulfate and sodium chloride to form double salts. Such aqueous solutions include, but are not limited to, aqueous magnesium chloride. The gas medium may be any desired gas. Hot air is the most preferred gas.

Fluidized bed heater(15), containing the epsomite-halite mixture, is heated to a temperature of between about 47° C., the temperature at which the epsomite crystals become unstable, and about 100° C. The crystals within heater(15), however, must be maintained at a temperature less than about 83° C. since, as noted above, temperatures above 83° C. may cause the epsomite to melt. The heating should be performed for a time of between about 1 and 10 minutes, depending on the temperature, i.e., the higher the temperature used, the shorter the time, and vice versa.

In the most preferred embodiment of the invention, the epsomite-halite mixture is heated at a temperature between about 60° C. and about 70° C. for about 4 to about 6 minutes.

Upon being heated, the epsomite crystals break down as noted above into multiple clusters, each comprising a plurality of fine crystals of hydrated magnesium sulfate, i.e., having a degree of hydration lower than that of epsomite ($<7H_2O$). Each crystal cluster retains the same outward appearance as the original, larger epsomite crystal that it was formed from.

The crystal clusters are then milled(17) by subjecting them to a "slight pressure", defined as a sufficient amount of pressure that, when applied to the clusters, breaks them into a plurality of fine, individual lesser hydrated (i.e., than epsomite) magnesium sulfate crystals which can then be easily separated from the coarse halite crystals by known techniques such as screening. The heating and milling steps may be carried out separately, but it is most preferred that they be performed together (See, e.g. Example 3 below).

The preferred method of applying the pressure necessary to mill the crystal clusters is by directing a flow of pressurized air onto the crystal clusters at a pressure of about 6 atm. However, any mild milling technique or other form of mild agitation may be used which is capable of achieving the same result.

' After the milling step, it is most preferred to separate the magnesium sulfate crystals from the halite crystals by elutriation. With the use of this technique, air is pumped into a vessel(19) containing the mixture of coarse halite and relatively fine magnesium sulfate crystals. The air is fed at a velocity greater than the settling velocity of the fine magnesium sulfate, thus causing the relatively fine magnesium sulfate crystals(21) to rise above the coarser and heavier halite crystals. Thereafter, crystals(21) are trapped by cyclone(23) and collected for further treatment as described below. Alternatively, a number of other well known separation techniques, such as screening, may be utilized in place of the elutriation process.

Figure 2:
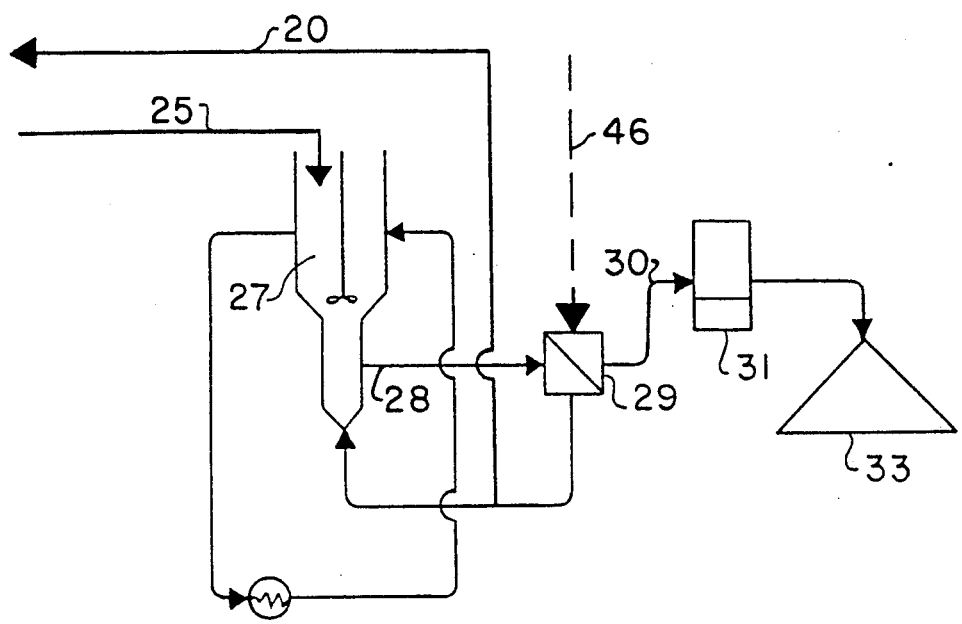
FIG. 2 schematically illustrates an embodiment of the process shown in FIG. 1 wherein the magnesium sulfate crystals obtained at (25) in FIG. 1 are subsequently recrystallized in an atmospheric crystallizer.

Turning now to FIG. 2, a first alternative embodiment of the invention is described wherein, at ambient temperature, water is added to the elutriated crystals(25) obtained from cyclone(23) to convert the magnesium sulfate hexahydrate or lower hydrate crystals into epsomite. This conversion is preferably carried out in an atmospheric crystallizer(27). The size of the resulting epsomite crystals may be controlled by controlling the temperature of the mixture and the rate of crystallization within crystallizer(27).

During the crystallization to epsomite, it is important to keep the solution at a temperature below about 47° C., since, as noted above, at temperatures above about 47° C., epsomite crystals become unstable. A temperature of about 30° C. is preferred. Crystals(28), obtained from crystallizer(27), are then washed with water and centrifuged(29), the resulting material(30) is then dried in a fluidized bed drier(31), at a temperature of about 40° C. to about 45° C., and transported to stock pile(33) for packaging. The material thus produced is high grade epsomite(30). Any excess solution(20) is returned to conveyor(5) to wash the incoming feedstock.

Figure 3:
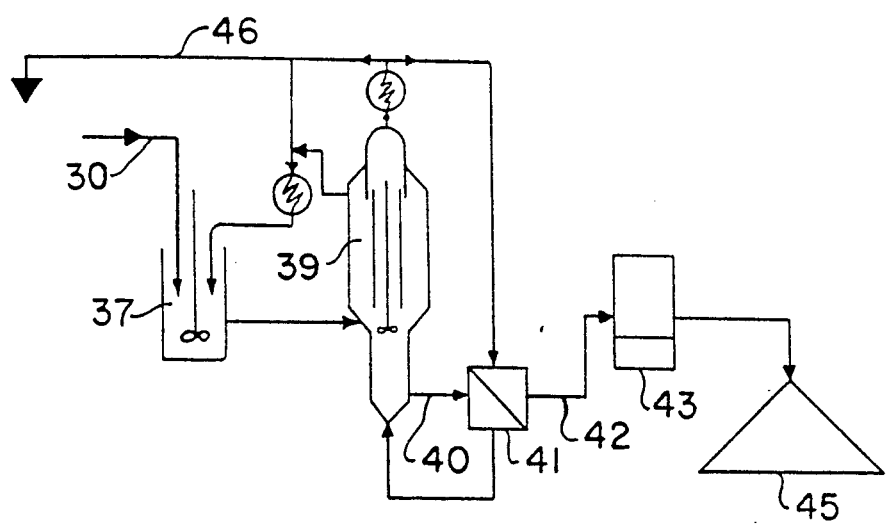
FIG. 3 schematically illustrates a variation on the embodiment of FIG. 2 wherein the material obtained at (30) in FIG. 2 is recrystallized in a vacuum crystallizer.

If desired, as shown in FIG. 3, the high grade crystals(30) can be further recrystallized. Thus, the centrifuged crystals(30) are redissolved in water(37) and recrystallized in a vacuum crystallizer(39). Subsequently the recrystallized product(40) is centrifuged(41), the resulting material(42) is then dried in fluidized bed drier(43) at a temperature of about 40° to about 45° C., and transported to stock pile(45) for packaging. The material thus produced is pure grade epsomite. Any remaining particles from the recrystallization step, such as magnesium sulfate crystals which are too fine, are returned as shown in step(46), to centrifuge(29) in FIG. 2.

Figure 4:
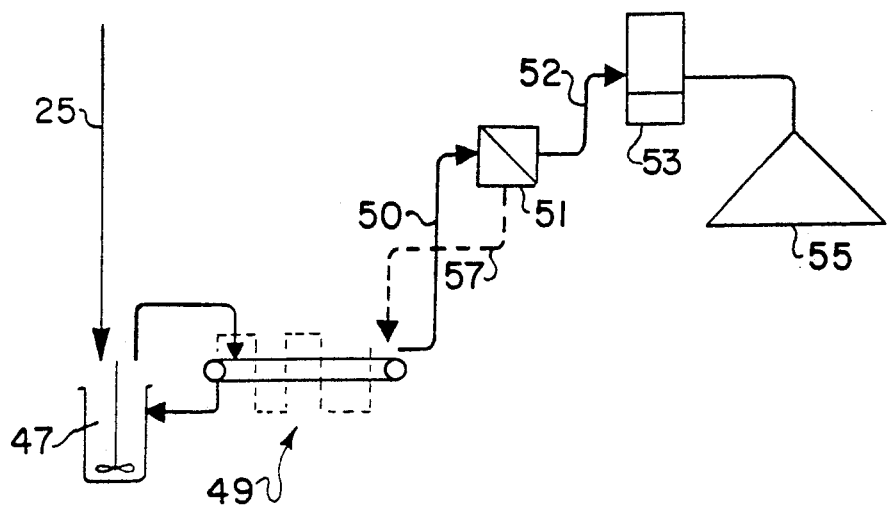
FIG. 4 schematically illustrates an alternate embodiment to the process shown in FIG. 2 wherein the magnesium sulfate crystals obtained at (25) in FIG. 1 are recrystallized using a counter-current filter extractor.

Turning now to FIG. 4, the hydration of hexahydrate magnesium sulfate to high grade epsomite may alternatively be carried out using a counter current belt filter extractor, which is well known in the art. In this embodiment, the epsomite obtained(25) in FIG. 1 is first slurried with water(47). The resultant slurry is then passed through the extractor(49). One example of a counter current belt filter extractor which may be used with the present invention is the EIMCO-Extractor horizontal belt filter manufactured by the EIMCO Process Equipment Company of Salt Lake City, Utah. The invention is not limited, however to the use of the particular counter current belt filter extractor described above. Extracting the epsomite slurry with such an instrument, in particular, the EIMCO Model 4630, produces a washed epsomite cake with less than 0.2 wt. % sodium chloride. In the process, some of the epsomite will be dissolved into the wash, thus, it is recommended that the wash water be added to fresh water and recycled(57) through extractor(49).

The product obtained(50) from the extraction(49), is then washed and centrifuged(51), the resulting material(52) is then dried at a temperature of about 40° C. to about 45° C. in fluidized bed drier(53), and transported to stock pile(55) for packaging.

Figure 5:
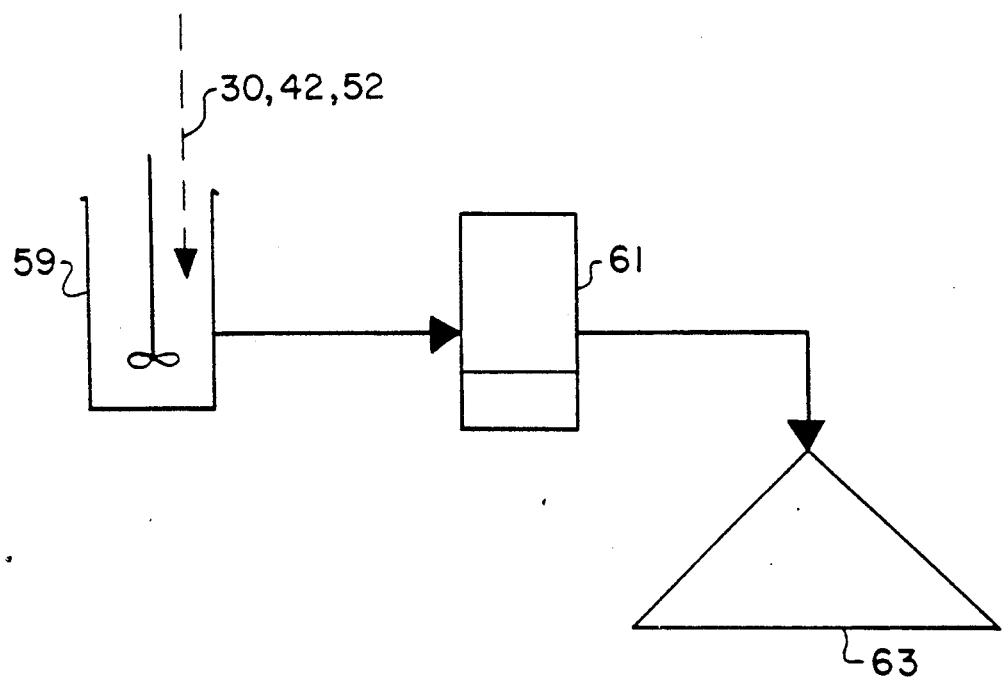
FIG. 5 schematically illustrates the dehydration of the epsomite crystals obtained from either FIG. 2 at (30), FIG. 3 at (42) or FIG. 4 at (52) using a fluidized bed drier.

As illustrated in FIG. 5, the centrifuged epsomite obtained from any one of the embodiments of the processes described above(30, 42 or 52), may thereafter be either dissolved to produce a solution or melted to produce a slurry of magnesium sulfate(59). This slurry or solution can then be dehydrated in a fluidized bed drier(61), wherein the dehydration is performed at various temperatures to form a range of hydrated magnesium sulfate compounds. Alternatively, if desired, the slurry or solution can also be dehydrated in a spray drier but this process is not as preferred. When the drehydration step is performed in a fluidized bed drier, the material may be dried at a temperature of between 400° C. and about 500° C., preferably at about 450° C., to form anhydrous magnesium sulfate. Alternatively, the material may be dried at a temperature of between about 100° C. and about 250° C., preferably 200° C., to form kieserite, i.e., magnesium sulfate monohydrate. Subsequent to the dehydration step(61), the crystals are transported to stock pile(63) for packaging.

The resulting anhydrous and monohydrate magnesium sulfate products are particularly useful as desiccants because the material can absorb up to 100% of its weight in water without caking. This is caused by a conversion of the anhydrous magnesium sulfate to heptahydrated magnesium sulfate. Pure grade magnesium sulfate products of this type can be used as an anticaking agent for food products such as table salt.

EXAMPLES

The following examples are provided only for the purpose of illustrating the invention and are not to be construed as limiting the invention in any manner. The mesh size used in all of the following examples is standard U.S. mesh size.

EXAMPLE 1

A +10 mesh epsomite-halite mixture was heated with 70° C. mineral oil for 10 minutes. The crystal clusters thus formed were then milled using a soft rubber-lined roller on a soft rubber-lined surface until the clusters broke down into a plurality of fine individual magnesium sulfate crystals. The mixture was then screened on a 10 mesh screen. The +10 mesh material was determined to comprise about 88 to 90% sodium chloride, whereas the −10 mesh material was found to be about 95 to 96% $MgSO_4 \cdot 6H_2O$.

EXAMPLE 2

A +10 mesh mixture of 80% by weight epsomite and 20% by weight sodium chloride was heated with hot air at a temperature of 60° C. for five minutes. The heated mixture was then milled with a soft rubber-lined roller on a soft rubber-lined surface in the same manner as described in Example 1. The mixture was then screened on a 10 mesh screen. The +10 mesh material contained about 88% sodium chloride by weight and the −10 mesh material contained about 6% sodium chloride by weight.

EXAMPLE 3

A +10 mesh epsomite-halite mixture was heated at 50° C. in a magnesium chloride solution ($MgCl_2$) and substantially simultaneously mixed for 6 minutes to break the resultant clusters. The material obtained after heating and mixing the epsomite-halite mixture was then screened. The +10 mesh fraction contained about 75% sodium chloride while the −10 mesh fraction contained about 3% sodium chloride.

EXAMPLE 4

Magnesium sulfate hexahydrate obtained from Example 2 was hydrated with water at 25° C. for 10 minutes and recrystallized. The resulting material was centrifuged to provide epsomite containing only about 0.02% sodium chloride.

EXAMPLE 5

Epsomite obtained from Example 4, of about 0.02% sodium chloride was dissolved with water and recrystallized under vacuum to provide a slurry of epsomite. The slurry was centrifuged to provide epsomite containing only about 0.01% sodium chloride.

EXAMPLE 6

Purified epsomite was melted at a temperature of about 80° C., the resultant slurry was dehydrated at a bed temperature of 450° C. in a fluidized bed drier. The resulting material comprised anhydrous magnesium sulfate containing about 33% magnesium oxide.

EXAMPLE 7

Purified epsomite was melted at 80° C. and dehydrated in a fluidized bed drier at a bed temperature of 250° C. The resulting material was substantially kieserite.

EXAMPLE 8

The anhydrous material obtained from Example 5 was maintained for one month in an environment of 100% humidity. The material doubled its weight without caking.

EXAMPLE 9

Kieserite from Example 7 was placed on a screen and exposed to a flow of water vapor. The kieserite absorbed the water and converted to epsomite without caking.

It is noted that the above description is merely illustrative of the invention, and other parameters and embodiments may be used without departing from the inventive concept herein. Accordingly, the present invention is only limited by the claims appended hereto.

I claim:

1. A method of recovering magnesium sulfate from a mixture of epsomite and halite, said method comprising:
   providing a mixture of epsomite and halite crystals;
   heating said mixture at a sufficient temperature for about 1 to 10 minutes to convert at least some of said epsomite crystals to clusters of comparatively finer magnesium sulfate crystals which are less hydrated than said epsomite;
   applying a sufficient amount of pressure to collapse substantially all said clusters into a plurality of substantially separate crystals of less hydrated magnesium sulfate in admixture with said halite;
   separating the less hydrated magnesium sulfate crystals from the halite crystals; and
   recovering the less hydrated magnesium sulfate crystals.

2. The method of claim 1 wherein the mixture is heated at a temperature of between about 47° C. and 83° C., for about 1 to 10 minutes to convert said epsomite crystals to said less hydrated magnesium sulfate crystals.

3. The method of claim 2 wherein said mixture is heated at a temperature of between about 60° C. and 70° C. for about 4 to about 6 minutes to convert substantially all said epsomite crystals into said less hydrated magnesium sulfate crystals.

4. The method of claim 1 further comprising recrystallizing said less hydrated magnesium sulfate crystals to convert substantially all said less hydrated magnesium sulfate crystals to epsomite.

5. The method of claim 4 wherein said magnesium sulfate crystals are recrystallized in an atmospheric crystallizer to convert substantially all said less hydrated magnesium sulfate crystals to high grade epsomite.

6. The method of claim 5 which further comprises recrystallizing the high grade epsomite in a vacuum crystallizer to convert said high grade epsomite to pure grade epsomite.

7. The method of claim 4 wherein said less hydrated magnesium sulfate crystals are recrystallized in a counter current belt filter extractor to convert said less hydrated magnesium sulfate crystals to high grade epsomite.

8. The method of claim 4 further comprising dehydrating the epsomite crystals in a spray drier or a fluidized bed drier.

9. The method of claim 8 wherein a fluidized bed drier is used to dehydrate said epsomite crystals at a bed temperature of from about 400° C. to about 500° C. to convert said epsomite to anhydrous magnesium sulfate.

10. The method of claim 8 wherein a fluidized bed drier is used to dehydrate said epsomite crystals at a bed temperature of from about 100° C. to about 250° C. to convert said epsomite to magnesium sulfate monohydrate.

11. The method of claim 8 wherein a fluidized bed drier is used to dehydrate said epsomite crystals at a bed temperature of less than about 100° C. to convert said epsomite to a hydrated magnesium sulfate product selected from the group consisting of magnesium sulfate dihydrate, magnesium sulfate trihydrate, magnesium sulfate tetrahydrate, magnesium sulfate pentahydrate, and magnesium sulfate hexahydrate.

12. The method of claim 1 wherein the mixture is heated in an aqueous magnesium chloride medium.

13. The method of claim 1 wherein the mixture is heated by directing a stream of relatively warm air thereupon, said air having a temperature sufficient to convert at least some of said epsomite crystals to clusters of comparatively finer magnesium sulfate crystals which are less hydrated than said epsomite.

14. The method of claim 1 wherein the mixture is heated with an organic based liquid.

15. The method of claim 1 wherein the mixture is heated with an oil.

16. The method of claim 15 wherein said oil is a mineral oil.

17. The method of claim 1 wherein said clusters are collapsed by directing a flow of compressed air thereupon.

18. The method of claim 1 wherein said clusters are collapsed by contacting them with at least one roller meant for applying a slight pressure thereto.

19. The method of claim 1 wherein said magnesium sulfate crystals are separated from said halite crystals by elutriation.

20. The method of claim 1 wherein the heating and pressure applying steps are carried out substantially simultaneously.

21. A method of recovering magnesium sulfate from a mixture of epsomite and halite, said method comprising:
   providing a mixture of epsomite and halite crystals;
   heating said mixture to a temperature of between about 472 C. and 83° C. for between about 1 to 10 minutes to convert at least some of said epsomite crystals to clusters of comparatively finer magnesium sulfate crystals which are less hydrated than said epsomite;

applying a sufficient amount of pressure to collapse said clusters into a plurality of substantially separate crystals of less hydrated magnesium sulfate in admixture with said halite;

separating the less hydrated magnesium sulfate crystals from the halite crystals;

recovering the magnesium sulfate crystals; and recrystallizing the less hydrated magnesium sulfate crystals to form an epsomite product selected from the group consisting of high and pure grade epsomite.

22. The method of claim 21 further comprising dehydrating the epsomite crystals in a spray drier or a fluidized bed drier.

23. The method of claim 22 wherein a fluidized bed drier is used to dehydrate said epsomite crystals at a bed temperature of from about 400° C. to about 500° C. to convert said epsomite to anhydrous magnesium sulfate.

24. The method of claim 22 wherein a fluidized bed drier is used to dehydrate said epsomite crystals at a bed temperature of from about 100° C. to about 250° C. to convert said epsomite to magnesium sulfate monohydrate.

25. The method of claim 22 wherein a fluidized bed drier is used to dehydrate said epsomite crystals at a bed temperature of less than about 100° C. to convert said epsomite to a hydrated magnesium sulfate product selected from the group consisting of magnesium sulfate dihydrate, magnesium sulfate trihydrate, magnesium sulfate tetrahydrate magnesium sulfate pentahydrate, and magnesium sulfate hexahydrate.

26. A method of recovering magnesium sulfate from a mixture of epsomite and halite, said method comprising:

providing a mixture of epsomite and halite crystals;

heating said mixture with hot air to a temperature of between about 47° C. and 83° C. and for about 1 to 10 minutes to convert at least some of said epsomite crystals to clusters of comparatively finer magnesium sulfate crystals which are less hydrated than said epsomite;

directing a stream of compressed air upon said clusters to collapse said clusters into a plurality of substantially separate crystals of less hydrated magnesium sulfate in admixture with said halite;

separating the less hydrated magnesium sulfate crystals from the halite crystals; and recovering the less hydrated magnesium sulfate crystals.

27. A method of recovering magnesium sulfate from a mixture of epsomite and halite, said method comprising:

providing a mixture of epsomite and halite crystals;

heating said mixture to a temperature of between about 47° C. and 83° C., for about 1 to 10 minutes to convert at least some of said epsomite crystals to clusters of comparatively finer magnesium sulfate hexahydrate crystals in admixture with said halite;

applying a sufficient amount of pressure to collapse at least some of said clusters into a plurality of substantially separate crystals of magnesium sulfate hexahydrate;

separating said magnesium sulfate hexahydrate crystals from the halite crystals; and recovering the magnesium sulfate hexahydrate crystals.

28. The method of claim 27 wherein the mixture is heated to a temperature of between about 60° to 70° for about 4 to 6 minutes to convert substantially all said epsomite crystals to said magnesium sulfate hexahydrate crystals.

29. The method of claim 28 which further comprises recrystallizing said magnesium sulfate hexahydrate crystals to convert substantially all said magnesium sulfate hexahydrate crystals to epsomite.

30. The method of claim 29 further comprising dehydrating epsomite crystals in a spray drier or a fluidized bed drier.

* * * * *

UNITED STATES PATENT AND TRADEMARK OFFICE
CERTIFICATE OF CORRECTION

PATENT NO. : 5,281,242
DATED     : January 25, 1994
INVENTOR(S) : Abraham Sadan

It is certified that error appears in the above-indentified patent and that said Letters Patent is hereby corrected as shown below:

Column 8, claim 21 line 6, change "472C." to --47°C. --.

Signed and Sealed this

Thirtieth Day of August, 1994

Attest:

BRUCE LEHMAN

Attesting Officer          Commissioner of Patents and Trademarks